US012644953B2

(12) United States Patent
Byrne

(10) Patent No.: US 12,644,953 B2
(45) Date of Patent: Jun. 2, 2026

(54) DYNAMIC FIXED WIRELESS OFFLOAD GATEWAY

(71) Applicant: T-MOBILE INNOVATIONS LLC, Overland Park, KS (US)

(72) Inventor: Cameron Brent Byrne, Seattle, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 349 days.

(21) Appl. No.: 18/318,170

(22) Filed: May 16, 2023

(65) Prior Publication Data

US 2024/0385279 A1     Nov. 21, 2024

(51) Int. Cl.
*G01S 5/02* (2010.01)
*H04W 48/04* (2009.01)

(52) U.S. Cl.
CPC ...... *G01S 5/02525* (2020.05); *G01S 5/02523* (2020.05); *H04W 48/04* (2013.01)

(58) Field of Classification Search
CPC . G01S 5/02525; G01S 5/02523; H04W 48/04

USPC ...................................................... 455/456.1
See application file for complete search history.

(56) References Cited

U.S. PATENT DOCUMENTS

| | | | |
|---|---|---|---|
| 2017/0180938 A1* | 6/2017 | Smith | H04W 4/08 |
| 2021/0219143 A1* | 7/2021 | Khalid | H04W 8/005 |
| 2022/0167114 A1* | 5/2022 | Patel | H04W 4/021 |
| 2024/0137784 A1* | 4/2024 | Gan | H04L 41/0663 |

* cited by examiner

*Primary Examiner* — Michael R Neff
(74) *Attorney, Agent, or Firm* — SHOOK, HARDY & BACON L.L.P.

(57) ABSTRACT

The present technology relates to a method and system for providing fixed wireless access (FWA) services to user devices in a cellular network. The system is configured to receive signal data from the user device operating within the coverage area of the cell site and analyze the signal data to identify characteristics that indicate the user device is a FWA device. Upon determining that the user device is a FWA device, the controller switches the user device to a virtual anchor point associated with the cell site, enabling the device to connect to the network using FWA services. The virtual anchor point is associated with the cell site and may be established through a virtual gateway.

20 Claims, 4 Drawing Sheets

DYNAMIC FIXED WIRELESS OFFLOAD GATEWAY

TECHNICAL FIELD

The present invention relates to the field of wireless telecommunications and networking, specifically to improving the performance of fixed wireless access (FWA) devices by using a single cell site and virtual anchor point.

SUMMARY

The present invention provides a method and system for improving the performance of FWA devices by using a single cell site and virtual anchor point. This involves receiving signal data from a user device operating within the coverage area of a cell site, analyzing the signal data to identify characteristics that indicate the user device is a fixed wireless device, and upon determining that the user device is an FWA device, and switching the user device to a virtual anchor point associated with the cell site. This virtual anchor point serves as a gateway to the network's fixed wireless access service, enabling the device to connect and receive optimized data transmission with low latency and high bandwidth.

BRIEF DESCRIPTION OF THE DRAWINGS

The present technology is described in detail herein with reference to the drawing figures, which are intended to be exemplary and non-limiting in nature, wherein.

DETAILED DESCRIPTION

Figure 1:
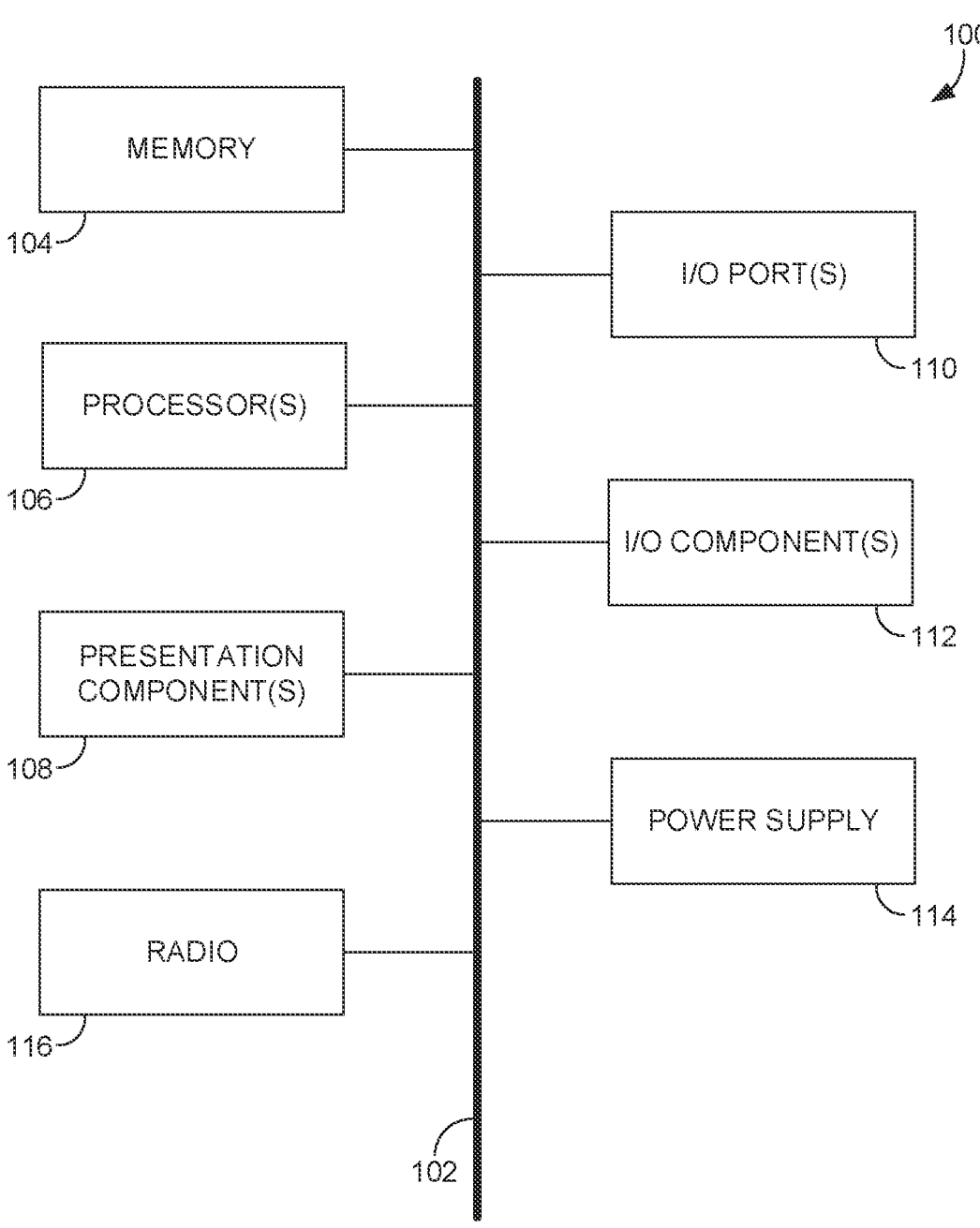
FIG. 1 depicts an exemplary computing environment suitable for use in implementation of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms 3G Third-Generation Wireless Technology
4G Fourth-Generation Cellular Communication System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that describes these terms may be found in Newton's Telecom Dictionary, 32nd Edition (2022).

A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1×A, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same.

By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

Wireless communication has become an integral part of our lives, and the demand for high-speed internet connectivity is increasing rapidly. FWA is one of the most promising technologies that can provide high-speed broadband connectivity to homes and businesses. FWA allows users to connect to the internet wirelessly via a fixed wireless access point without relying on a wired connection. In this context, single cell sites play a crucial role in providing FWA services to users.

A single cell site is a wireless base station that provides coverage over a limited geographical area. These cell sites are typically used to provide cellular service to mobile devices. However, with the emergence of FWA technology, single cell sites can now be used to provide high-speed internet access to homes and businesses in the area. By leveraging FWA, cell sites can provide high-speed connectivity to users without requiring a wired connection.

One of the challenges in providing FWA services is identifying the user devices that are compatible with this technology. Unlike mobile devices, FWA devices are stationary and designed to connect to a specific access point. Therefore, it is crucial to identify whether a user device is an FWA device or not to ensure that it can connect to the network seamlessly.

To address this challenge, a method for identifying FWA devices and switching them to a virtual anchor point associated with the cell site has been proposed. This method involves analyzing the signal data received from the user device to identify characteristics that indicate the device is an FWA device. Upon determining that the device is an FWA device, the method switches the device to a virtual anchor point associated with the cell site, enabling the device to connect to the network using FWA service.

The virtual anchor point associated with the cell site is a fixed location in the network that serves as the point of entry for FWA devices. By switching the FWA device to the virtual anchor point, the device can establish a direct connection with the cell site and receive high-speed internet access without relying on a wired connection.

In a cellular network, multiple cell sites are typically used to provide coverage over a wide geographical area. These cell sites are connected to a common point, known as the gateway, which serves as the point of entry for user devices to the network. The gateway is typically connected to the core network, which provides the necessary routing and switching functions to connect the user devices to the internet or other services.

When a user device connects to the network, it first establishes a connection with the cell site that provides the strongest signal. The cell site then forwards the signal to the gateway, which routes it to the core network. From there, the signal is sent to the destination device or service. In a network that provides FWA services, multiple cell sites may be connected to a single gateway. This allows the network to provide coverage over a larger area and ensures that FWA devices can connect to the network seamlessly. To ensure that FWA devices can connect to the network efficiently, the network may use techniques such as beamforming and MIMO (Multiple-Input, Multiple-Output) to improve signal strength and reduce interference. These techniques can help to improve the performance of FWA devices and ensure that users receive a consistent and reliable internet connection.

In a network that uses multiple cell sites on a single gateway, it is important to ensure that the signal from each cell site is synchronized to avoid interference and ensure that the devices can connect seamlessly. This is typically achieved by using a centralized timing source, such as GPS, to synchronize the cell sites.

Using a central gateway for FWA networks presents some challenges. One of the biggest issues is the increased traffic that is generated by FWA devices, which can put a strain on the network and impact performance. With FWA, users typically consume a lot of data due to the nature of the service, which can include streaming high-definition video, online gaming, and other data-intensive activities. This means that the FWA network can experience a significant increase in traffic compared to traditional cellular networks, which were designed primarily for voice and text communication.

When all FWA traffic is routed through a central gateway, the gateway can become a bottleneck for the network. This can lead to congestion, slow data speeds, and even network downtime if the gateway is overwhelmed with traffic. Additionally, a central gateway can also introduce latency into the network, which can impact the quality of the user experience.

This disclosure aims to solve this problem by introducing a method that enables using a single cell site and determining that a user device is a FWA user device, and then switching that device to a virtual anchor point associated with the cell site, can help to solve some of the challenges presented by a central gateway in FWA networks.

The present invention provides several advantages over existing methods for improving the performance of FWA devices. By using a single cell site and virtual anchor point, the invention reduces the load on the central gateway, which in turn improves the overall performance and efficiency of the network. Additionally, this approach can improve the experience of users who rely on FWA for their connectivity needs, such as those in rural or remote areas where traditional wired broadband is not available. By enabling FWA devices to connect to the network using a fixed wireless access service, this technology can improve the reliability and speed of data transmission, thereby providing a more satisfying user experience.

In one aspect, the present invention involves a method and system for improving the performance of FWA devices by using a single cell site and virtual anchor point. In one embodiment, a receiver receives signal data from a user device operating within the coverage area of a cell site. The signal data is then analyzed to identify characteristics that indicate the user device is a fixed wireless device. These characteristics may include the type of device, the signal strength, and other factors that are indicative of a fixed wireless access device.

Upon determining that the user device is an FWA device, a controller automatically switches the user device to a virtual anchor point associated with the cell site. This virtual anchor point serves as a gateway to the network's fixed wireless access service, enabling the device to connect and receive optimized data transmission with low latency and high bandwidth. By switching to this virtual anchor point, the device can bypass the traditional central gateway that may be congested with traffic from other devices in the network, thereby enabling faster and more reliable connectivity.

Referring to the drawings in general, and initially to FIG. 1, an exemplary computing environment 100 suitable for practicing embodiments of the present technology is provided. Computing environment 100 is but one example, and is not intended to suggest any limitation as to the scope of use or functionality of the embodiments discussed herein. Neither should the computing environment 100 be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 10.

Power supply 114 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Figure 2:
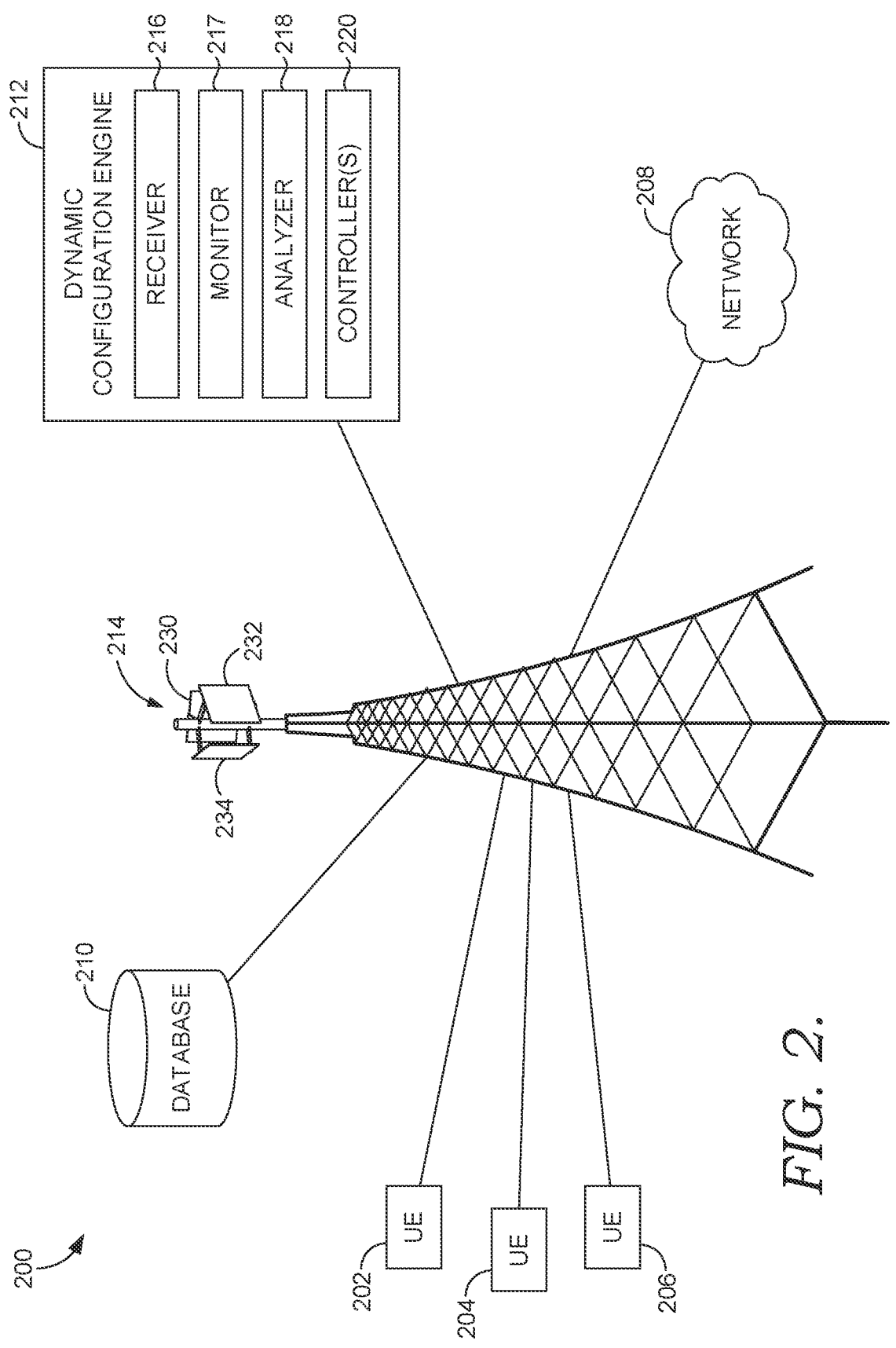
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic configuration engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the user devices 202, 204, and 206 when the uses devices 202, 204, and 206 are geographically situated outside of the cell associated with cell site 214.

In some aspects user device 202, 204, and 206 may be considered a FWA device. This may occur if the user device uses a wireless connection to access high-speed internet service in a fixed location, such as a home or business premises. FWA devices include wireless routers, wireless modems, and other wireless equipment that can connect to a cellular network or other wireless network to provide internet access to users. These devices typically have antennas that are mounted in a fixed location and can be used to connect to a nearby cell site 214, which serves as a gateway to the internet. FWA devices have become increasingly popular in areas where wired broadband infrastructure is not available or is prohibitively expensive, such as rural or remote locations. By using FWA devices, users can access high-speed internet service without the need for a wired connection, providing a cost-effective and convenient solution for broadband connectivity.

In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with dynamic configuration engine 212, which comprises various components that are utilized, in various implementations, to perform one or more methods for identifying and determining if one or more UEs operating on a single cell with a restricted portion of a broadcasted spectrum. Generally, the dynamic configuration engine 212 may implement various coding techniques to reduce a UEs use of a bandwidth portion. In some implementations, dynamic configuration engine 212 comprises components including a receiver 216, a monitor 217, an analyzer 218, and a controller 220. However, in other implementations, more or less components than those shown in FIG. 2 may be utilized to carry out aspects of the invention described herein. The components of dynamic configuration engine 212 may take any one or more of many forms, but specifically may comprise one or more processors and/or servers configured to perform the functions described herein.

The receiver 216 of the dynamic configuration engine 212 is generally responsible for receiving information from various user devices, such as the user devices 202, 204, and 206, when located within the coverage area of cell site 214. Information sent from a user device to the cell site 214 may comprise location information of the user device and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed signal-to-interference-plus-noise ratio (SINR) and/or signal strength at the user device(s), or throughput of the connection between the cell site and the user device(s). Location and channel quality information may take into account the user device's capability, such as the number of antennas of the user device and the type of receiver used by the user device for detection. The receiver may be associated with a non-terrestrial network environment.

Monitor 217 is a component that is used in the process of analyzing the traffic generated by user devices 202, 204, and 206, and determining whether a device is being used as a FWA device. Monitor 217 is used for capturing and analyzing the network traffic generated by the user device 202, 204, and 206, and detecting the patterns and characteristics of FWA traffic. By analyzing the type, volume, and other characteristics of the traffic, the monitor 217 can determine whether the device is being used as a FWA device, and optimize the network performance and efficiency accordingly. Monitor 217 may be located at various points in the network infrastructure, including at the cell site, a user plane gateway, or other points in the network. By using advanced monitoring technology and algorithms, it is possible to accurately and reliably detect FWA devices.

The analyzer 218 is generally responsible for analyzing the characteristics and behavior of FWA devices, and determining whether a device is being used as an FWA device. Analyzer 218 examines the data collected by the receiver 216 and monitor 217, and identifying the specific patterns and characteristics of FWA devices. By analyzing the radio access technology used by the device 202, 204, and 206, examining its signal strength and quality, and analyzing the type and volume of traffic generated by the device 202, 204, and 206, the analyzer 218 can determine whether the device 202, 204, and 206 is being used as an FWA device. Analyzers may be implemented as software-defined functions within the network, and can be designed to automatically detect and classify FWA devices, optimize the network performance and efficiency, and generate alerts or notifications when FWA devices are detected.

Figure 3:
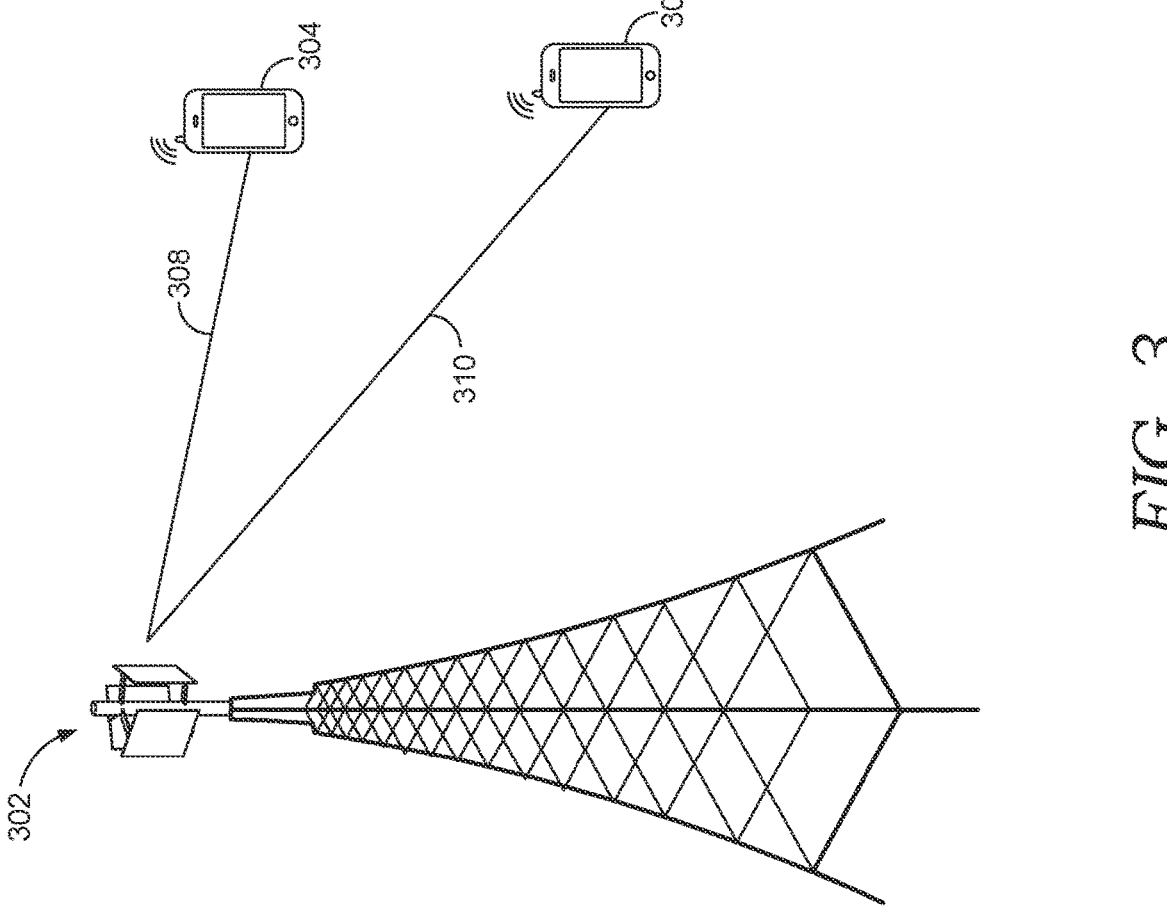
FIG. 3 illustrates a diagram of an exemplary network environment in which implementations of the present disclosure may be employed.

The controller 220 is generally responsible for managing the overall operation of the system and ensuring that the policy for adjusting the configuration and operation of the network is performed. For example, if the analyzer 218 determines that a user device 202, 204, or 206, is operating as a FWA device, the controller may then switch the FWA device from a central gateway to a virtual anchor point associated with the cell site. The controller 220 receives information from the monitor 216, analyzer 217, and configure engine 212 to make informed decisions about network access for devices. It uses this information to determine if a user device 202, 204, or 206 is operating as a FWA device. If so, the controller 220 instructs the dynamic configuration engine 212 to switch the user device to operate using a virtual anchor point associated with the cell site rather than a centralized gateway. The controller 220 is responsible for collecting and analyzing data from the receiver 216, monitor 217, and analyzer 218, and using this data to optimize the network performance and efficiency for FWA devices. By dynamically adjusting the configuration and operation of the network, the controller 220 can ensure that FWA devices are able to achieve the best possible performance and reliability, while minimizing interference with other devices in the network. Controllers may be implemented as software-defined functions within the network, and can be designed to automatically adjust network parameters FIG. 3 provides an exemplary network environment in which implementations of the present disclosure may be employed. Such a network environment is illustrated and designated generally as network environment 300. Network environment 300 is but one example of a suitable network environment and is not intended to suggest any limitation as to the scope of use or functionality of the invention. Neither should the network environment be interpreted as having any dependency or requirement relating to any one or combination of components illustrated.

Turning now to FIG. 3, an exemplary network environment 300 for transitioning one or more user devise that are FWA devices from a central gateway to a virtual anchor point associated with the cell site. The exemplary network environment may include a cell site 302, a first user device

304 and a second user device 306. In one aspect, the first user device 304 is operating as a wireless user device such as a mobile device described above. The first wireless device sends communications 308 to the network using a central gateway. This allows the first user device 304 to operate seamlessly while moving from the geographical communication area of the cell site 302 into geographical regions being serviced by other cell sites.

The second user device 306 in the network environment 300 may operate as a FWA device. The cell site 302 may determine, based on received communications that the second user device 304 is operating as a FWA device. This determination is described previously and may be done dynamically. The FWA device may be identified by geographical stability, bandwidth usage, or other analytical means. Once the second user device 306 is determined to be a FWA device, the cell site 302 may switch the communication from the second user device 306 to the network to be processed by central gateway to be by a virtual anchor point associated with the cell site 302. This allows communications 310 from the second user device 306 to the network to be stable and fixed to the cell site rather than a central gateway. In other aspects, if the second user device 306 is determined to be no longer a FWA device, the cell site may switch the communication back to being processed by the central gateway.

A FWA device is a type of wireless communication device that is designed to provide high-speed internet access to fixed locations. Unlike traditional wired broadband connections that rely on physical cables, FWA devices connect to the internet using wireless signals transmitted over the airwaves. These devices are typically used in areas where wired connections are unavailable or where the cost of laying physical cables is prohibitively high. FWA devices come in various forms, including routers, modems, and antennas, and can be used to connect a range of devices, including computers, smartphones, and smart home devices. Due to their ease of installation and flexibility, FWA devices are becoming increasingly popular in both rural and urban areas as a viable alternative to wired broadband connections.

In some aspects, the virtual anchor point is a logical network element that serves as a point of attachment for a user device in a cellular network. It is established through a virtual gateway and is associated with a particular cell site. The virtual anchor point acts as a gateway between the user device and the network, enabling the device to connect to the network using FWA services. By switching a FWA device from a central gateway to a virtual anchor point, the device can bypass the congestion of the central gateway and connect directly to the network, improving network efficiency and enhancing the quality of service for the device. The virtual anchor point also allows for better load balancing across the network, as traffic from FWA devices can be distributed across multiple virtual anchor points associated with different cell sites.

Figure 4:
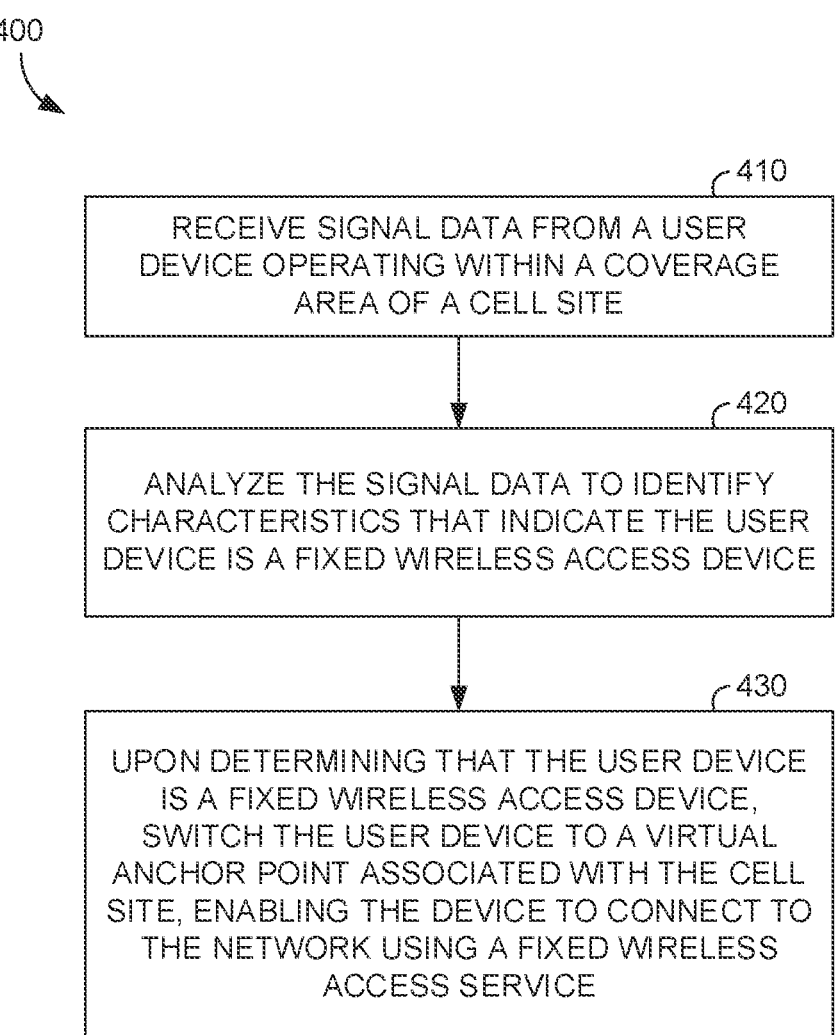
FIG. 4 depicts a block diagram of an exemplary method, in accordance with an embodiment of the present technology.

Turning now to FIG. 4, an exemplary method 400 for switching one or more devices from a central gateway to a virtual anchor point is presented. At step 410, a communication network node may receive signal data from a user device operating within the coverage area of a cell site. The receiving of the signal data includes the use of specialized equipment, such as receivers or base stations that are designed to collect and analyze the wireless signals transmitted by the user device. These signals may include data related to the type of device, the type of radio access technology being used, the signal strength and quality, and other key parameters that can identify if the user device is operating as a FWA device. Receiving signal data from user devices can be used to detect and classify devices that are being used for FWA, and to dynamically reconfigure the network to provide the best possible performance for these devices.

At step 420, analyzing the signal data received from user devices operating within the coverage area of a cell site allows for the method to identify key characteristics that indicate whether the device is being used for FWA. Some of the key characteristics that can be used to identify FWA devices include the type of device being used, the frequency bands and radio access technology being employed, the signal strength and quality, and the data usage patterns. For example, FWA devices typically use a fixed antenna and operate on a specific frequency band, such as the 28 GHz or 39 GHz bands, that is optimized for high-speed data transmission. Additionally, FWA devices often exhibit distinctive usage patterns, such as high data usage during specific time periods or consistent data usage levels over extended periods of time. By analyzing these and other characteristics of the signal data, network operators can accurately identify FWA devices within the network and dynamically reconfigure the network to optimize performance for these devices.

At step 430, once it has been determined that a user device is being used for FWA based on analysis of the signal data, the device can be automatically switched to a virtual anchor point associated with the cell site. This virtual anchor point serves as a gateway to the network's fixed wireless access service, enabling the device to connect and receive optimized data transmission with low latency and high bandwidth.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A system comprising:

a cell site comprising one or more processors and one or more computer storage hardware devices storing computer-usable instructions, that, when used by the one or more processors, cause the one or more processors to:

receive signal data from a device operating within a coverage area of the cell site;

analyze the signal data to identify characteristics that indicate the device is a fixed wireless access device; and upon determining that the device is the fixed wireless access device, assign the device to a virtual anchor point associated with the cell site.

2. The system of claim 1, wherein the characteristics that indicate the user device is the fixed wireless access device comprises one or more of a type of device, a signal strength, or a geographical location.

3. The system of claim 1, further comprising a gateway configured to route traffic between the virtual anchor point and the communications network.

4. The system of claim 1, further comprising a network management system configured to monitor and manage network resources associated with the virtual anchor point and the cell site.

5. The system of claim 1, wherein the processor is further configured to perform load balancing between multiple virtual anchor points associated with the cell site.

6. The system of claim 1, further comprising a network management system configured to monitor and manage network resources associated with the virtual anchor point and the single cell site.

7. The system of claim 1, wherein the node is further configured to:

receive an indication that the device supports one or more feature capabilities; and determine whether to remove the one or more feature capabilities based on the indication.

8. A method of managing a device comprising:

receiving signal data from a user device operating within a coverage area of a cell site;

analyzing the signal data to identify characteristics associated with the device;

based on the analyzing determining that the device is a fixed wireless access device; and upon determining that the user device is a fixed wireless access device, switching the user device to a virtual anchor point associated with the cell site, enabling the device to connect to the network using a fixed wireless access service.

9. The method of claim 8, wherein the virtual anchor point is selected based on the location of the fixed wireless access device relative to the single cell site.

10. The method of claim 8, wherein the virtual anchor point is determined based on the available bandwidth and network resources at the single cell site.

11. The method of claim 8, further comprising monitoring the network traffic at the virtual anchor point and dynamically adjusting the virtual anchor point based on network load and traffic patterns.

12. The method of claim 8, wherein the user device comprises a wireless modem or router.

13. The method of claim 8, wherein the user device is associated with a home or business premises.

14. The method of claim 8, further comprising authenticating the user device before switching it to the virtual anchor point.

15. One or more non-transitory computer-readable media having computer-executable instructions embodied thereon that, when executed, perform a method comprising:

receiving signal data from a user device operating within a coverage area of a cell site;

analyzing the signal data to identify characteristics associated with the device;

based on the analyzing determining that the device is a fixed wireless access device; and upon determining that the user device is a fixed wireless access device, switching the user device to a virtual anchor point associated with the cell site, enabling the device to connect to the network using a fixed wireless access service.

16. The media of claim 15, wherein the virtual anchor point is selected based on the location of the fixed wireless access device relative to the single cell site.

17. The media of claim 15, wherein the virtual anchor point is determined based on the available bandwidth and network resources at the single cell site.

18. The media of claim 15, further comprising monitoring the network traffic at the virtual anchor point and dynamically adjusting the virtual anchor point based on network load and traffic patterns.

19. The media of claim 15, wherein the user device 5 comprises a wireless modem or router.

20. The media of claim 15, wherein the user device is associated with a home or business premises.

* * * * *